United States Patent [19]

Boxer

[11] Patent Number: 5,625,851
[45] Date of Patent: Apr. 29, 1997

[54] EXTENDABLE GUIDE RAIL FOR A BELLOWS TYPE CAMERA

[76] Inventor: William M. Boxer, 29 W. Governor Dr., Newport News, Va. 23602

[21] Appl. No.: 611,326

[22] Filed: Mar. 8, 1996

[51] Int. Cl.⁶ .............. G03B 17/04; F16B 2/00; F16B 7/04
[52] U.S. Cl. .......... 396/341; 396/344; 403/370; 403/371
[58] Field of Search ................... 354/187, 191; 403/370, 371, 367; 211/129

[56] References Cited

U.S. PATENT DOCUMENTS

| | | | |
|---|---|---|---|
| 271,443 | 1/1883 | Flamming | 354/191 |
| 324,489 | 8/1885 | Roussel | 354/191 |
| 2,580,309 | 12/1951 | Little | 354/191 |
| 3,044,351 | 7/1962 | Patterson | 355/64 |
| 3,489,071 | 1/1970 | Mohr et al. | 354/156 |
| 3,650,192 | 3/1972 | Kellner | 95/45 |
| 4,095,246 | 6/1978 | Kellner | 354/187 |
| 4,331,408 | 5/1982 | Zeibig | 354/191 |
| 4,364,687 | 12/1982 | Adell | 403/370 |
| 4,591,252 | 5/1986 | Huhle | 354/191 |
| 5,154,558 | 10/1992 | McCallion | 411/54 |
| 5,164,755 | 11/1992 | King | 354/295 |

OTHER PUBLICATIONS

1992 Calumet Professional Imaging Catalog Published by Calumet, 890 Supreme Drive, Bensenville, Illinois 60106 p. 42 Showing Rails & Mounting Blocks.

*Primary Examiner*—Safet Metjahic
*Assistant Examiner*—Christopher E. Mahoney
*Attorney, Agent, or Firm*—H. Stanley Muir, III

[57] ABSTRACT

A composite guide rail for bellows type cameras is disclosed in which the composite rail is comprised of two rail pieces. A multi-fingered connecting insert has a base secured to the end of the first rail while the fingers conform to an inner cavity in one end of the second rail and can be slidably inserted-therein. A wedge having a threaded central bore is movably disposed between the plurality of fingers and is connected to a thumb screw by a threaded connecting rod, the thumb screw located at the opposite end of the first rail from the connecting insert. When the fingers are inserted into the cavity of the second rail and the thumbscrew turned in one direction, the fingers are expanded by the wedge being drawn therebetween such that the fingers come into pressing engagement with the walls defining the inner cavity of the second rail. When assembled, the first and second rails take on the aspect of a single rail.

16 Claims, 3 Drawing Sheets

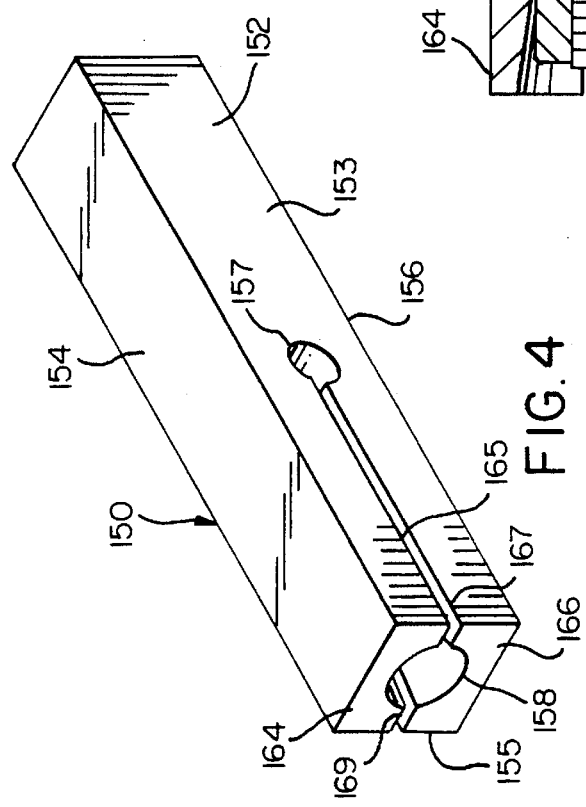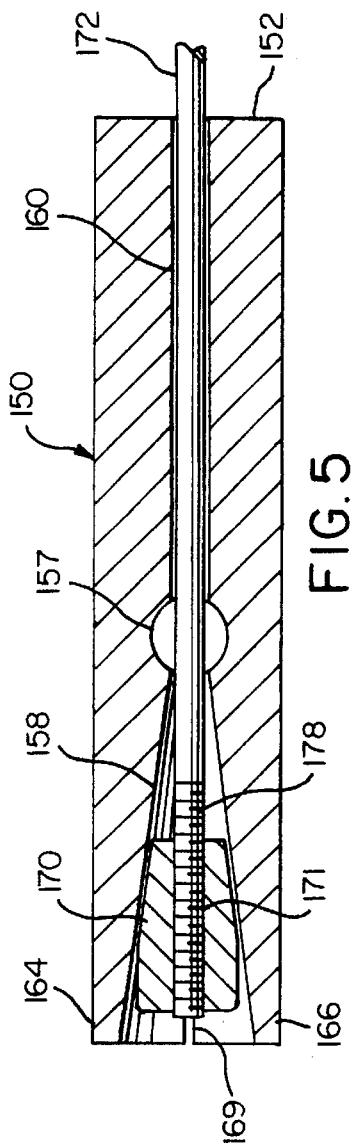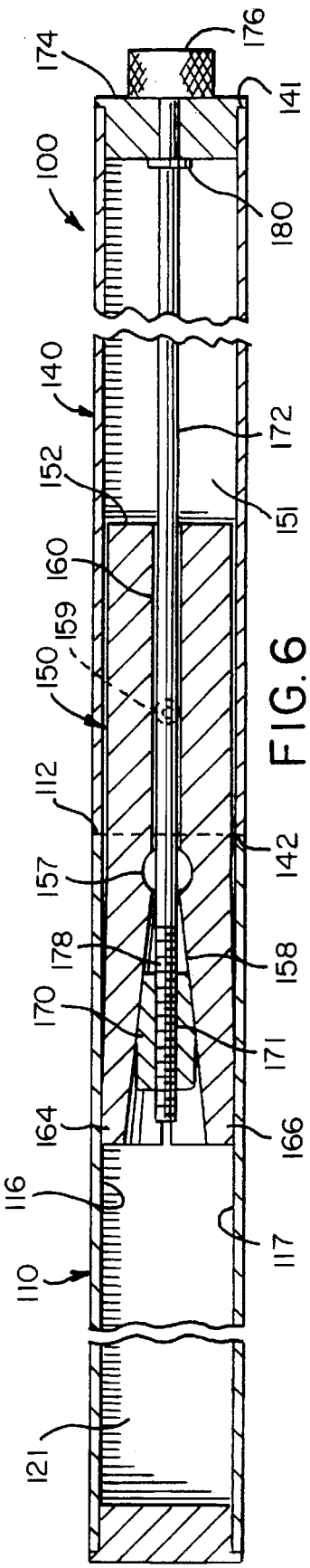

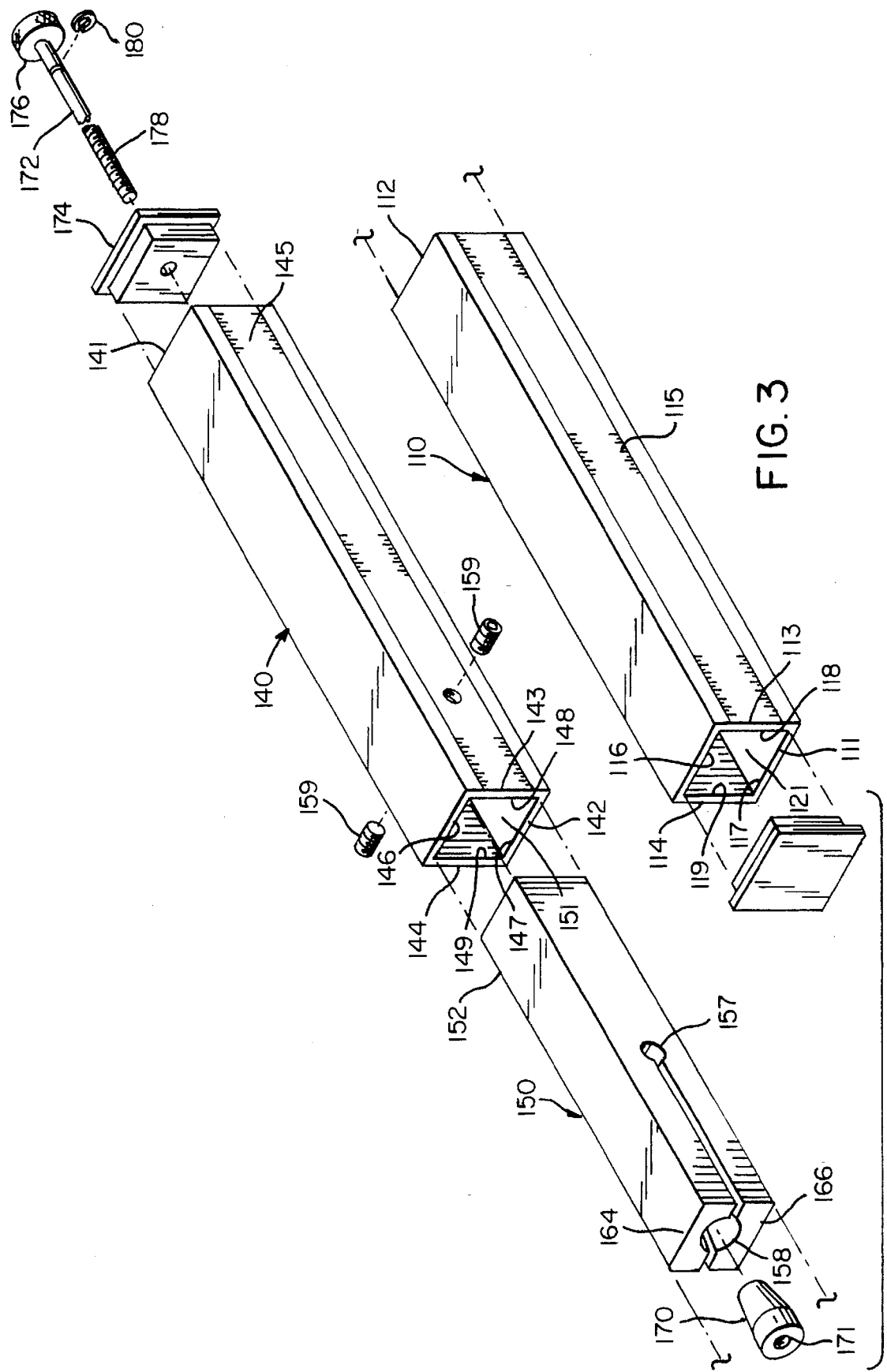

EXTENDABLE GUIDE RAIL FOR A BELLOWS TYPE CAMERA

BACKGROUND OF THE INVENTION

This invention relates to a bellows type view camera in which the lens carrier and image carrier are independently movable with respect to one another and are connected to one another by a bellows. More specifically, the present invention relates to the mounting apparatus for the camera, specifically, an extendable guide rail to which the lens carrier and image carrier are attached, the guide rail being extendable by adding a section to its length.

THE PROBLEM

Bellows type cameras have been in use for a considerable time and remain popular, notably among professional photographers, because of the improvements made over the years. Today, the bellows type camera is able to dramatically change the distance between the lens carrier and the image carrier; have the lens carrier and the image carrier tilt and swing with respect to the guide rail, shift the pivot point of the tilt axis on either the lens or the image carrier, and shift the placement of the subject on the image carrier without affecting the focus.

In order to achieve the proper image, focal length and focus for a desired subject, among other things, the photographer places the lens carrier further away from, or closer to, the image carrier. To hold the lens carrier and image carrier in position and to assist in adjustment of the camera components for a particular shot, the lens carrier and the image carrier are attached by lockable articulated standards which attach to a guide rail, the guide rail being the rigid support member for the camera which can itself be attached to a base or stand. The guide rail has a variety of functions. It provides a straight and level guide which keeps the lens carrier and image carrier in alignment. It provides a track which interacts with adjustment wheels on the standards to permit fine adjustments of the standards along the guide rail length enhancing the ability to focus the camera. It provides a rule with calibrations by which focal length can be easily set. Finally, it provides attachment surfaces for standards as well as base and stand mounts. Because each of these functions is important, the guide rail must be able to provide each capability along its length.

Most importantly, the guide rail must be able to accommodate the distance desired by the photographer between the image carrier and the lens carrier. Unfortunately, with long guide rails, the photographer often encounters problems with the guide rail end entering the field of view of the lens on close shots and, conversely, short guide rails being of insufficient length to provide proper focal length and field of view for other shots.

Prior art solutions addressing this trade off between too much length and too little have been several: guide rails in a variety of lengths which can be substituted for one another; using a subrail beneath two guide rails to support each guide rail allowing them to act as one; and screwing one guide rail on the end of another to permit the two to act as one, creating a compound rail.

Unfortunately, each of the implementations of these solutions suffers from shortcomings. Guide rails of varying lengths require that the camera be disassembled since the guide rail is the supporting member for both the image carrier and the lens. This wastes time and is an aggravation to the photographer. The subrail adds significant expense to the unit, can permit the supported guide rails to translate with respect to one another and does not provide the aspect of a single rail because of the separation between the two guide rails. Screw connection between the ends of two guide rails provide little mechanical strength; can loosen while in use causing the compound rail created thereby to bow; and takes a too much time to screw together.

There is therefore a need for a guide rail system which is economical to manufacture, which has the aspect of a single rail when assembled, which allows precise and exact adjustment of the lens relative to the camera and which is easily and quickly assembled and disassembled without the need to remove the image carrier and lens carrier from the guide rail.

THE SOLUTION

The foregoing problems and needs are met by the present invention which requires no subrail or other support between two pieces of a composite guide rail; which provides positive locating of the guide rail facing ends with respect to one another; which provides positive locking between the guide rails; and which presents a single guide rail aspect when assembled.

In accordance with one aspect of the invention, this is brought about by a composite guide rail comprised of a main section and an extension section, each having a central cavity at the connecting ends. A fork having expanding fingers is fixedly attached to the extension section by insertion of the fork body into the extension section central cavity such that the fork fingers extend out from the end of the extension section connecting end generally parallel to the centerline of the extension section. The fork fingers in their neutral position slidably fit into a cavity in the guide rail main section, connection achieved by forcing the fork fingers away from one another such that they pressingly engage the walls of the main section central cavity.

In accordance with another aspect of the invention, separation of the fork fingers is accomplished by a wedge located between the fork fingers which, as it translates in one direction, causes a gradual separation of the fork fingers from one another.

In accordance with yet another aspect of the invention, translation of the wedge is by a knurled thumbwheel on the end of the extension section opposite the expanding fork and connected to the wedge by a shaft having a threaded end which interacts with threads in the wedge to draw the wedge toward the thumbwheel.

In accordance with a still further aspect of the invention, the main section and the extension section of the guide rail are machined on their facing ends to fit together such that the assembled sections take on the aspect of an single guide rail.

BRIEF DESCRIPTION OF THE DRAWINGS

The accompanying drawings, which are incorporated in and constitute part of the specification, illustrate presently preferred implementations of this invention and, together with the general description given above and the detailed description of the preferred implementations given below, serve to explain the principles of the invention.

In the drawings:

FIG. 3 is an exploded perspective of the elements making up the present invention as it relates to a guide rail having a square cross section.

FIG. 4 is a perspective of an expansion fork according to the instant invention.

FIG. 5 is a cross section of the expansion fork of FIG. 4 showing the captured wedge and connecting rod.

FIG. 6 is a cross section of an assembled composite guide rod illustrating the connection between the fork fingers and the main section cavity.

DETAILED DESCRIPTION

Figure 1:
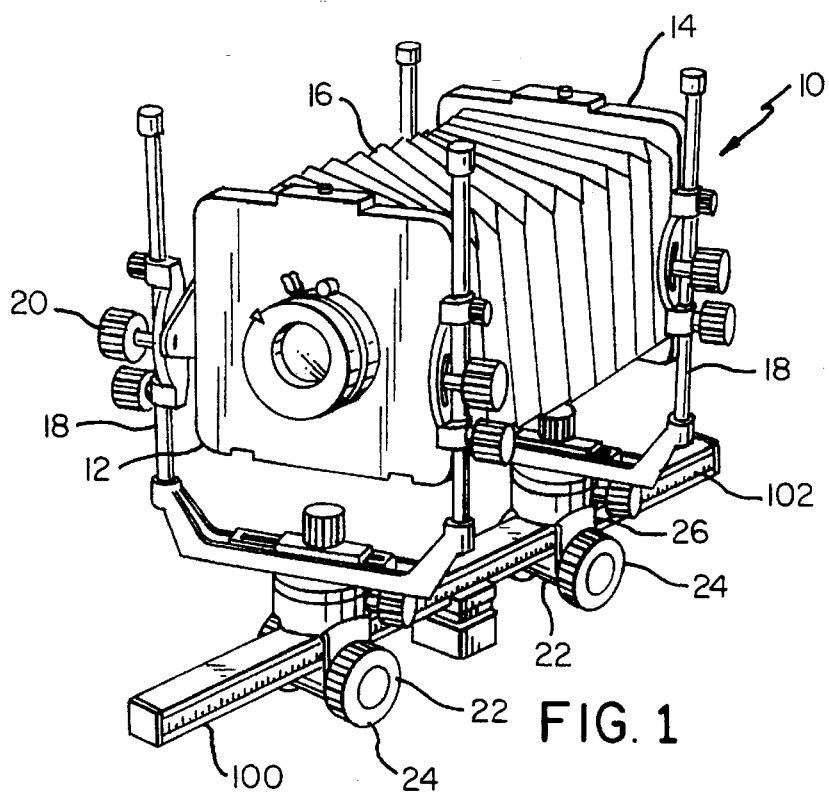
FIG. 1 is a perspective of a typical bellows type camera with its standards assembled on a guide rail.
Figure 2A:
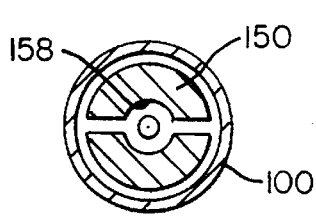
FIG. 2 a–f are cross sections of guide rails and expansion forks of various configurations.
Figure 2C:
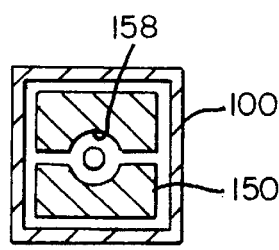
Figure 2E:
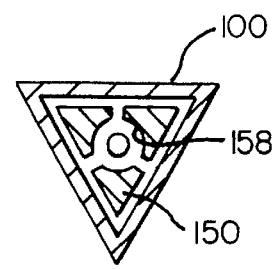
Figure 2B:
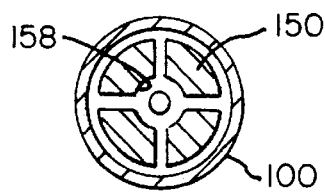
Figure 2D:
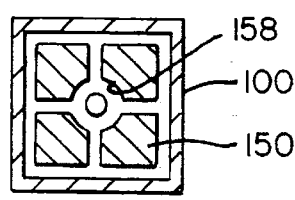
Figure 2F:
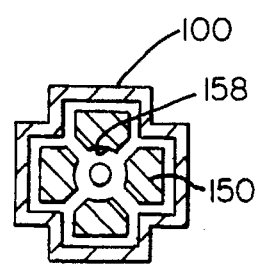

Reference will now be made in detail to the construction and operation of the preferred implementations of the present invention which are illustrated in the accompanying drawings. In the drawings, like elements are designated by like reference numbers. The following description of the preferred implementations is exemplary, and does not limit the invention to these specific implementations.

As shown in FIG. 1, a typical bellows type camera 10 includes a lens carrier 12 and image carrier 14 attached by flexible bellows 16. Articulated standards 18 support both the lens carrier 12 and the image carrier 14, the standards 18 incorporating locking mechanisms 20 to hold the articulating portions of the standard 18 in position. A truck 22 at the bottom of each standard 20 holds the standard in place against guide rail 100. Each truck 22 includes an adjustment knob 24 which permits the standard to translate along guide rail 100 in relatively fine increments through an attached drive wheel (not shown). Each truck incorporates a pointer 26 which assists in positioning the lens carrier and image carrier with respect to one another with reference to a incremented rule 102 along the side faces 104&106 of the guide rail 100.

Guide rail stock is conventionally extruded aluminum bars which are beneficially hollow throughout their length. Guide rails come in a variety of shapes, some of which are illustrated in cross section in FIG. 2. The present invention is adaptable to work with known guide rail shapes as illustrated by the expansion forks, subsequently described, also shown in cross section in FIG. 2.

Turning to the instant invention, as shown in FIG. 3, a composite guide rail 100 is constructed from two pieces of extruded aluminum stock, a guide rail main section 110 and a guide rail extension section 140. The guide rail main section 110 is of a determined length defined by a tail end 111 and a connecting end 112. For ease in description, the embodiment subsequently described has a square cross section and hollow interior. Along the left and right outer side walls 113 & 114, respectively, the guide rail has mirroring rules 115 which have incremental markings to assist in positioning attached standards 18. The inner cavity 121 extending from tail end 111 to connecting end 112 is defined by top 116, bottom 117, left 118 and right 119 inner walls.

The guide rail extension section 140 is of a determined length defined by a head end 141 and a connecting end 142. The extension section 140 has the same cross section and is of the same size as the main section 110, which is square in the embodiment being described, and likewise has a hollow interior. Along the left and right outer side walls 143 & 144, respectively, the guide rail extension section has mirroring rules 145 which continue the incremental markings found on the main section rules 115. The inner cavity 151 extending from head end 141 to connecting end 142 is defined by top 146, bottom 147, left 148 and right 149 inner walls.

The connecting end 112 of main section 110 and the connecting end 142 of extension section 140 are complementarily machined such that when positioned against each other, the centerline of the extension section 140 is positioned along the same line as the main section 110. In the embodiment being described, the connecting ends 112 and 142 are, respectively, machined perpendicular to the centerline of main section 110 and extension section 140. It is however recognized that other shapes and angles can be provided within the spirit of the invention.

As shown FIGS. 3&4, an expansion fork 150 has a base 152 defined by sides 153&155, top 154 and bottom 156. The expansion fork 150 is dimensioned such that base 152 fits into the cavity in extension section 140 at connecting end 142. Extending outwardly from fork base 152, are upper and lower fingers 164 and 166, respectively, dimensionally the same in combination as the base 152. Fingers 164&166 are separated by a channel 169 cut such that the fingers are of the same approximate thickness. The channel 169 is defined by inner opposing finger faces 165&167, respectively of upper finger 164 and lower finger 166. Channel 169 terminates at a hinge bore 157, also defined by inner opposing finger faces 165&167, which extends between expansion fork sides 153&155 in the plane of the centerline of the expansion fork and perpendicular to the expansion fork sides 153&155. As shown in FIG. 5, a wedge bore 158, centered on the centerline of the expansion fork, opens at the distal ends of fingers 164&166 and penetrates the expansion fork 150 a desired distance to penetrate and terminate on the hinge bore 157. A rod bore 160 centered on the centerline of the expansion fork opens on the terminal end of the fork base 152 and penetrates the expansion fork to penetrate and terminate on hinge bore 157.

The expansion fork 150 is assembled in the preferred embodiment to the extension section by screws 159 penetrating the outer side walls 143&144 and fork base 152. However, it is recognized that other attachment methods, including dimensioning the fork base to provide an interference fit with the extension section cavity, can likewise be utilized.

A wedge 170 resides in wedge bore 158. In the preferred embodiment, the wedge is generally conical in shape, actually a frustrum, the apex of the cone being removed. Centered on the centerline of the wedge 170 is a threaded circular wedge bore 171 extending the length of the wedge 170 and opening at both its ends.

A connecting rod 172 extends the length of the connected expansion fork and extension section. At the head end 141 of the extension section, rod 172 extends through a cap 174 placed over head end 141 where rod 172 is staked to a knurled thumbwheel 176. Just beneath cap 174 the diameter of rod 172 is reduced and in which resides a circlip 180 which prevent the rod 172 from translating further through cap 174 in the direction of the thumbwheel 176. The opposite end of rod 172 is threaded back from its termination to approximately the distance of the hinge bore 156. The threaded end 178 of rod 172 is screwed into the rod bore 171 of wedge 170. By rotating thumbwheel 176 in one direction, wedge 170 is draw toward the head end 141 of the extension section 140 and by rotating the thumbwheel 176 in the opposite direction, wedge 170 is forced away from head end 141.

In the preferred embodiment, the wedge 170 and the wedge bore 158 are of complementary configurations with similar respective slope and taper. While differing slopes and tapers will work, they typically produce only a line of contact between the wedge 170 and the wedge bore 158. By using similar slopes and tapers, a greater surface area of the wedge 170 comes in contact with the wedge bore 158.

Specifically, in the preferred embodiment, the wedge 170 is generally conical and the wedge bore 158 is similarly tapered from its opening to its bottom at an angle approximating the slope of the wedge. The taper does not duplicate the slope of the wedge because this can create too great a surface area contact making it more difficult to translate the wedge in the wedge bore.

Because the guide rail sections are the same in dimension and configuration, except perhaps in length, the fork fingers 164&166 will insert into the guide rail main section cavity 121. Upon insertion, connecting ends 112&142, of the main section and the extension section respectively, contact one another. The interaction between the fork fingers 164&166 with main section inner walls 116–119 and main section connecting end 112 with the extension section connecting end 142 cause the extension section 140 to align with the main section 110. Turning thumbwheel 176 in the proper direction causes connecting rod 172 to rotate drawing wedge 170 toward the thumbwheel. In so doing, because of the shape of the wedge 170 and the wedge bore 158, the wedge comes into pressing engagement with the wedge bore 158, forcing the fork fingers 164&166 apart. Attention is drawn to the hinge bore 157 which reduces the cross section at the proximal end of each fork finger with a radius. This permits the fork fingers to more easily flex and separate and do so without creating a single stress point at the proximal end of each fork finger. As the upper and lower fork fingers 164&166, respectively, are separated, the upper finger contacts and engages the main section inner cavity top wall 116 and the lower finger contacts and engages the main section inner cavity bottom wall 117, thereby locking the extension section to the main section.

By virtue of the construction of the sections and the expansion fork, upon assembly of the extension section 140 to the main section 110, the assembly takes on the aspect of a single guide rail, the sections having a common centerline and outer dimensions and the rules 115&145 seamlessly proceed in increments as though a single unbroken rule. Upon assembly, the lens carrier standard 18 can be moved forward along the extension section 140 easily, without disassembly or readjustment. Advantageously, the rule 145 by being a continuation of rule 115 permits easy setting to a new focal length. Moreover, while assembly is quick requiring only insertion and a few turns of the thumbwheel, the resulting connection produces a rigid composite guide rail easily able to handle the rigors of repeated assembly and disassembly and the torques and forces of setting to different attitudes and positions.

To disassemble, the thumbwheel 176 is turned in the opposite direction from that used for assembly which causes connecting rod 172 to rotate forcing wedge 170 away from the thumbwheel 176. In so doing, because of the shape of the wedge 170 and the wedge bore 158, the wedge disengages from the wedge bore 158 defined by the inner surface of the fork fingers 164&166, permitting the fork fingers to relax and draw closer to one another to an "at rest" position. As the upper and lower fork fingers 164&166, respectively, draw closer to one another, the upper finger 164 disengages from the main section inner cavity top wall 116 and the lower finger 166 disengages from the main section inner cavity bottom wall 117. The extension section 140 may then be removed from the main section 110 by pulling the fork fingers from the main section cavity 121.

While the instant invention has been described in terms of a preferred embodiment, it is recognized and appreciated that various modifications and improvements can be made within the spirit of the invention. For example, while the fork fingers have been described as two in number, this number could be three, four, or more depending upon the desired connection and the configuration of the main section cavity. Further, while the main section and extension section of the guide rail are described in the preferred embodiment as being hollow throughout, this need not be so. The main section need only be bored to create a cavity of suitable length for the insertion of the fork fingers and the extension section machined to create the fork fingers at its connecting end. In such an arrangement, a passageway is drilled for the connecting rod through the length of the extension section. Alternatively, a more compact draw mechanism such as a keyway on the connecting rod and an insertable key used to draw the connecting rod and wedge into the wedge bore is usable. The change in the shape of the cavity in the main section and the extension section also can easily be accommodated within the instant invention, as illustrated by FIG. 2. For example, a cavity having a circular cross section requires only that the expansion forks likewise have a circular combined cross section. A cavity having a "box cross" cross section similar to two rectangles laid at right angles to one another, is accommodated by creating a four fingered expansion fork in which two channels are cut, each connecting opposing corners in a square base and each corner milled by rectangular cuts to create the desired cross section. This permits each of the fingers to expand into one of the cross ends upon insertion. Likewise, the use of a thumbwheel and threaded shaft to draw the wedge into the wedge bore can be replaced by another mechanism such as a cam lock which draws the wedge into the wedge bore. Finally, it can be appreciated that if the expansion fork fingers are of a sufficient length, the extension section can be translated away from the main section while some portion of the fork fingers remain in the main section cavity and continue to engage the main section inner walls, thus imparting the ability to telescope the sections to add more length to the composite rail.

The invention is thus limited only as defined in the accompanying claims.

I claim:

1. For a photographic bellows type camera having an image carrier standard and a lens carrier standard which are movable with respect to one another, a composite guide rail to which the image carrier standard and lens carrier standard are slidably mounted, the composite guide rail comprising:

a main section of a desired length having inner walls forming a cavity at a connecting end of the main section length;

a separate extension section of a desired length having a cavity at the connecting end of the extension section length;

an expansion fork including a body and at least two fingers, the body fitting into the cavity in the connecting end of the extension section length, and connected to the extension section, and the at least two fingers slidably fitting into the main section cavity; and means for releasably separating from one another the at least two fingers, whereby, when the at least two fingers of the expansion fork are inserted in the main section cavity, with separation of the at least two fingers from one another, the at least two fingers engage the inner walls of the main section cavity locking the main section and the extension section to one another and, with release of separation of the at least two fingers from one another, the at least two fingers disengage from the inner walls of the main section cavity, unlocking the main section and the extension section from one another and allowing the extension section, with the connected expansion fork, to be removed from the main section.

2. The composite guide rail of claim 1, in which the outer surfaces of the expansion fingers are complimentary in configuration to the inner walls of the guide rail main section.

3. The composite guide rail of claim 2, in which the at least two fingers have inside surfaces which collectively define a first bore of a desired configuration opening at the distal ends of the at least two fingers and in which the separating means is comprised of a wedge having an outer configuration complementary to the first bore.

4. The composite guide rail of claim 3, in which the separating means is further comprised of means to draw the wedge into the first bore.

5. The composite guide rail of claim 4, in which the means to draw the wedge into the first bore comprises:

a second bore extending through the expansion fork body approximately concentric with the centerline of the length of the guide rail extension section;

a third bore in the wedge approximately concentric with the centerline of the length of the guide rail extension section; and a shaft passing through the second bore and connected to the wedge along the third bore by which the wedge is translatable between a first position in the first bore and a second position in the first bore.

6. The composite guide rail of claim 5, in which the connection between the shaft and the wedge comprise complementary threads along the third bore and along the length of the shaft interacting with the third bore, and a retainer means which prevents translation of the shaft with respect to the length of the guide rail extension section, whereby rotation of the shaft in one direction draws the wedge deeper into the first bore and rotation of the shaft in the opposite direction forces the wedge along the first bore toward the terminal ends of the fingers.

7. The composite guide rail of claim 6, in which the first bore is tapered complementary to the taper of the wedge such that the wedge and the bore interact over more than a line of contact.

8. The composite guide rail of claim 7, in which the at least two fingers comprise two fingers, each finger slightly less than half the thickness of the expansion fork body to thereby define a gap of generally consistent dimension from one side of the expansion fork to the other extending to the proximal ends of the two fingers.

9. The composite guide rail of claim 8, in which the means to draw the wedge into the first bore further comprises a knob staked to one end of the shaft.

10. The composite guide rail of claim 9, in which the connecting end of the guide rail base section and the connecting end of the guide rail extension section are shaped such that, upon engagement, the base section and the extension section take on the aspect of a single guide rail.

11. For a photographic bellows type camera having an image carrier standard and a lens carrier standard which are movable with respect to one another, a composite guide rail to which the image carrier standard and lens carrier standard are slidably mounted, the composite guide rail comprising:

a main section of a desired length having inner walls defining a cavity at a connecting end of the main section length;

a separate extension section Of a desired length having, at a connecting end of the extension section length, an expansion fork having at least two fingers, the two fingers insertable into the main section cavity and having inside surfaces which collectively define a first bore of a desired configuration opening at the distal ends of the two fingers;

a wedge occupying at least a portion of the first bore;

a second bore extending through the expansion fork approximately concentric with the first bore;

a third bore in the wedge approximately concentric with the centerline of the wedge;

a shaft passing through the second bore and connected to the wedge along the third bore by which the wedge is translatable;

the connection between the shaft and the wedge comprise complementary threads along the third bore and along a portion of the length of the shaft which interacts with the third bore;

a retainer means which prevents translation of the shaft with respect to the length of the guide rail extension section between a first position in the first bore and a second position in the first bore; and a knob staked to the end of the shaft opposite the threaded portion, whereby, when the two fingers of the expansion fork are inserted in the main section cavity, turning the knob in one direction causes the wedge to translate along the shaft toward the knob causing the wedge to move deeper into the first bore which causes the two fingers to move apart from one another and causes the two fingers to engage the main section cavity inner walls to lock the guide rail extension section to the guide rail main section.

12. The composite guide rail of claim 11, in which the wedge is a frustrum.

13. The composite guide rail of claim 12, in which the connecting end of the guide rail base section and the connecting end of the guide rail extension section are shaped such that, upon engagement, the base section and the extension section take on the aspect of a single guide rail.

14. For a photographic bellows type camera having an image carrier standard and a lens carrier standard which are movable with respect to one another, a composite guide rail to which the image carrier standard and lens carrier standard are slidably mounted, the composite guide rail comprising:

a main section of a desired length having inner walls defining a cavity at a connecting end of the main section length;

a separate extension section of a desired length having at a connecting end of the extension section length an expansion fork having at least two fingers, the at least two fingers insertable into the main section cavity; and means for varying the distance between the at least two fingers, whereby, when the at least two fingers of the expansion fork are inserted in the main section cavity and the distance between the at least two fingers is increased, the at least two fingers engage the main section cavity inner walls.

15. The composite rail of claim 14, in which the at least two fingers aproximate the length of the guide rail main section and the main section cavity is of sufficient depth to permit insertion of the at least two fingers, whereby, the at least two fingers permit the total length of the composite guide rail to be greater than the sum of the lengths of the main section and the extension section by having some portion of the fingers outside the main section cavity when engaged.

16. A connection device for connecting a first rail to a second rail, said first rail having a first connecting end and a first rail cavity defined by a first rail inner surface opening on the first connecting end and extending inwardly therefrom a distance along the length of the rail, and said second rail having a second connecting end and a second rail cavity defined by a second rail inner surface opening on the second connecting end and extending inwardly therefrom a distance along the length of the said second rail, said connection device comprising:

an insert having a first end conforming to the configuration and dimension of said first rail cavity whereby said first end fits snugly within said first rail cavity;

connecting means whereby said first end of said insert is held in place in said first rail cavity;

said insert having a second end defined by a plurality of fingers which extend away from said first end, said fingers in the aggregate conforming to the configuration and dimension of said second rail cavity whereby said second end slidably and removably fits within said first rail cavity;

a wedge interposed between said second end plurality of fingers; and means for selectively drawing said wedge toward said insert first end and distancing said wedge away from said insert first end, whereby said plurality of fingers are forced outwardly when said wedge is moved in one direction relative to said insert first end such that said plurality of fingers are further separated from one another and come into pressing engagement with the first rail inner surface to connect said first rail to said second rail and whereby said plurality of fingers return to an at rest position when said wedge is moved in the opposite direction relative to said insert first end such that said plurality of fingers release pressing engagement with the first rail inner surface to disconnect said first rail from said second rail.

\* \* \* \* \*